April 12, 1960     P. E. PEMBERTON     2,932,057
COUNTERBALANCE MEANS FOR UPWARDLY ACTING DOORS AND THE LIKE
Filed May 22, 1959     2 Sheets-Sheet 1

INVENTOR.
Paul E. Pemberton
BY
Attorney

April 12, 1960     P. E. PEMBERTON     2,932,057
COUNTERBALANCE MEANS FOR UPWARDLY ACTING DOORS AND THE LIKE
Filed May 22, 1959     2 Sheets-Sheet 2

INVENTOR.
Paul E. Pemberton
BY
Attorney.

United States Patent Office 2,932,057
Patented Apr. 12, 1960

2,932,057

COUNTERBALANCE MEANS FOR UPWARDLY ACTING DOORS AND THE LIKE

Paul E. Pemberton, Hartford City, Ind., assignor to Overhead Door Corporation, Hartford City, Ind., a corporation of Indiana Application May 22, 1959, Serial No. 815,216

8 Claims. (Cl. 16—198)

This invention relates to counterbalance means particularly desirable for use in counterbalancing upwardly acting doors which is also desirable and readily adapted for counterbalancing other reciprocably mounted parts.

The main objects of this invention are:

First, to provide a counterbalancing means for upwardly acting doors which may be readily adapted or is adjustable to counterbalance doors of widely varying weights such as results from variation in size, materials, hardware and various other factors.

Second, to provide a counterbalancing means having these advantages in which one type or structure of counterbalance spring coupling member serves to connect the shaft or winding drum or other rotatable part of the counterbalance to a support or relatively fixed part and one which may be used with spring counterbalance assemblies which require both right and left hand springs.

Third, to provide a coupling member having these advantages with which the spring may be quickly and easily assembled without the necessity of using special tools and also tensioned to meet particular load requirements without the aid of special tools and which may be connected to associated members by standard types of bolts and screws.

Fourth, to provide a coupling member having these several advantages which is very economical in structure and which does not subject the associated springs to stresses other than torsion and load stresses thereby minimizing breakage of the springs.

Objects relating to details and economies of the invention will appear from the description to follow. The invention is defined and pointed out in the claims.

A preferred embodiment of the invention is illustrated in the accompanying drawing, in which.

Figure 1:
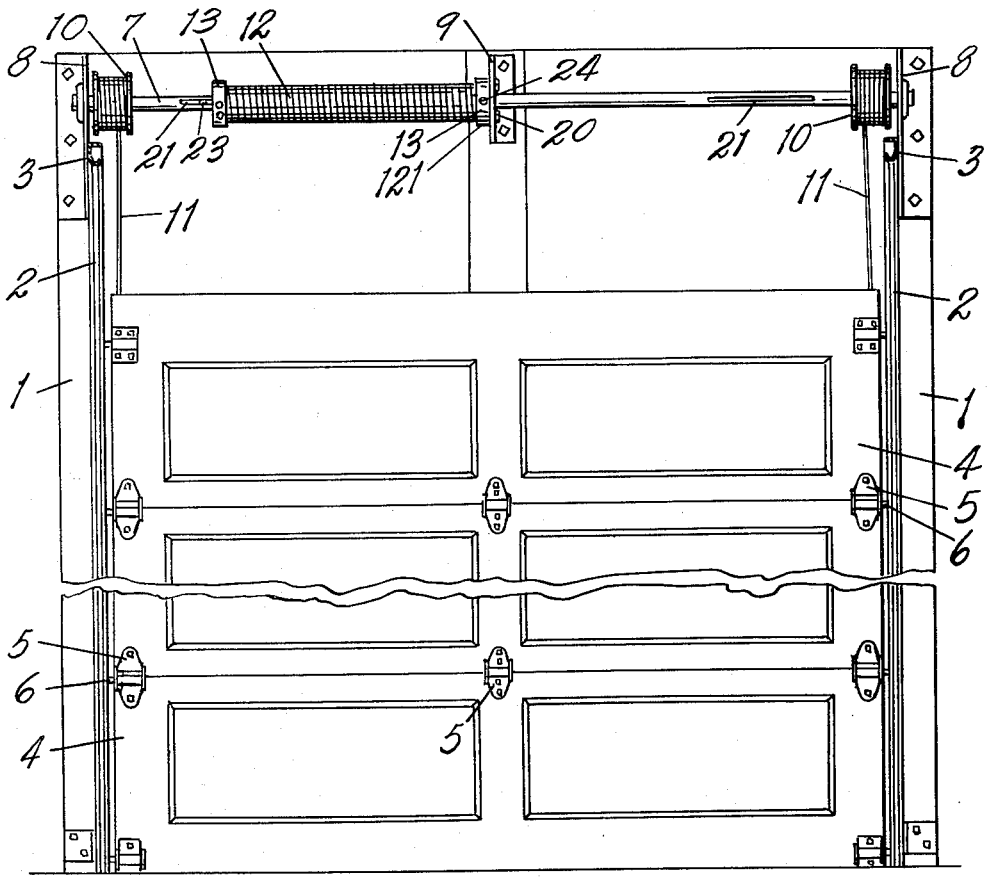
Fig. 1 is a fragmentary side elevational view of an upwardly acting door assembly illustrating an embodiment of my invention, certain parts being shown conventionally.

In Fig. 1 I have illustrated an adaptation of my counterbalance for an upwardly acting door employing only a single torsion spring. It should be understood that frequently two springs, so called right and left hand springs, are required.

The embodiment illustrated comprises a door frame 1 having tracks 2 operatively associated therewith. The tracks 2 comprise vertical portions shown in full lines which have horizontal sections 3 at their upper ends. The door illustrated is made up of sections 4 hingedly connected by the hinges 5 and provided with track engaging members conventionally illustrated at 6.

The counterbalance comprises the shaft 7 mounted on the brackets 8 and 9 and provided with drums 10 for the counterbalance cables 11. These parts are conventionally shown. Only one counterbalancing spring 12 is illustrated but it is desired to again point out that more than one counterbalancing spring may be used if desired. As stated, the doors differ greatly in weight as a result of variation in size and materials.

It has been customary in this art to provide springs of different sizes or springs adapted for counterbalancing particular loads. To avoid this necessity, I provide means for supporting the spring and coupling it to the shaft which not only effectively supports the spring but permits adjusting of the torsion thereof to counterbalance doors of varying weight.

The coupling members designated generally at 121 comprise body portions 13, preferably cylindrical, and having axially projecting stems 14 longitudinally slotted at 15 to receive the inturned lug 16 on the end coil 17 of a spring. These lugs are provided at both ends of the spring. At its inner end the slot is provided with oppositely disposed keeper recesses 18 with one of which the lug may be engaged. These coupling members are provided with axially extending bores 19 desirably internally threaded to receive threaded attaching screws or bolts 20 for clamping one coupling member of a pair against the intermediate shaft supporting bracket 9.

The shaft 7 is provided with a longitudinal key way or spline groove 21 while the coupling members are provided with angularly spaced internal spline grooves 22 so that one coupling member of the pair may be keyed to the shaft by means of splines or keys 23 after the spring has been properly tensioned. The coupling members are provided with radial bores 24 with which a bar or rod-like tool may be engaged to facilitate proper tensioning of the spring. It also is desirably provided with radial bores 25 adapted to receive set screws at 26 designed primarily for holding the parts in position after assembling and before tensioning the spring and also during the tensioning of the spring.

Figure 2:
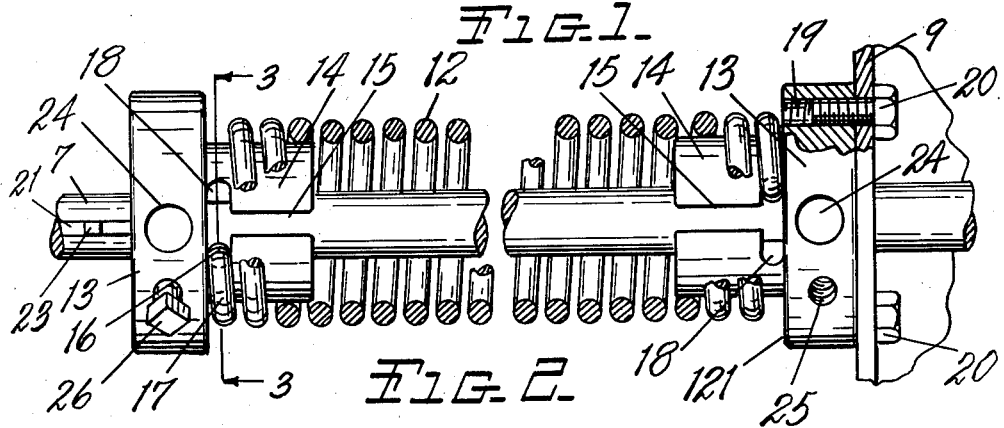
Fig. 2 is an enlarged fragmentary view with the springs partially in longitudinal section and partially broken away.
Figure 4:
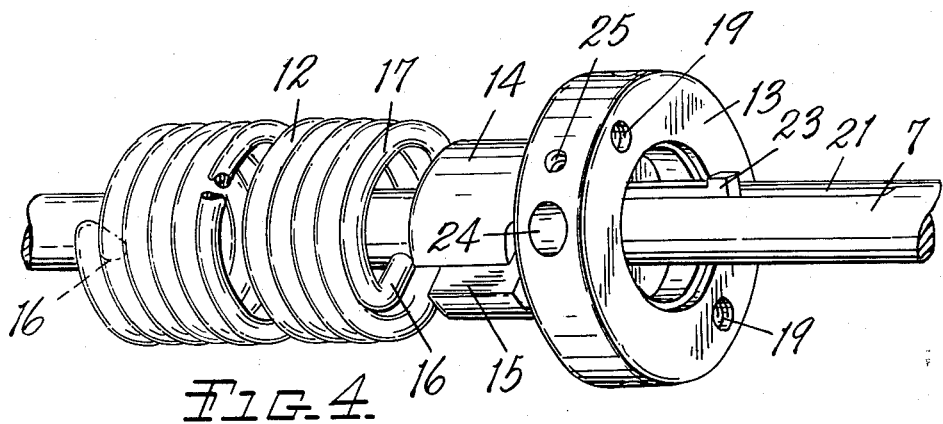
Fig. 4 is a fragmentary perspective view of the shaft, the coupling member and spring illustrating the positioning of the spring prior to assembling or connecting with the coupling member.
Figures 3, 5:
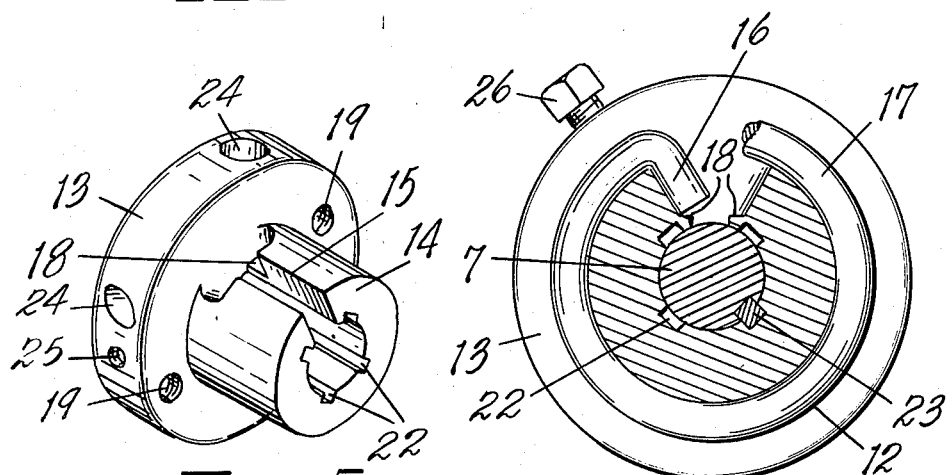
Fig. 3 is an enlarged cross sectional view on a line corresponding to line 3—3 of Fig. 2.
Fig. 5 is an inside perspective view of one of the coupling members.
Figure 6:
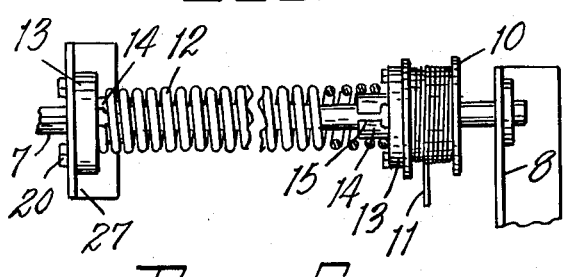
Fig. 6 is a fragmentary view in which one of the coupling members is directly connected to a winding drum instead of through a shaft.

However, after the spring has been properly tensioned the keys or splines 24 are inserted to secure or lock one coupling member to the shaft, the other being fixedly or nonrotatably secured to the bracket 9 or other support, as illustrated in Figs. 1, 2 and 3. However, as illustrated in Fig. 6, the one coupling member may be directly secured to one of the winding drums 10 in which case the other coupling member is secured to a fixed support or bracket indicated at 27 in Fig. 6.

In assembling a coupling member with a spring it is only necessary to telescope the stem of the coupling member into the end of the spring, the coupling member being positioned so that the lugs 20 of the spring pass through the slot 15 to be lockingly engaged with one or the other of the recess-like keepers 18, depending upon the end with which the coupling member is engaged.

The applicant is familiar with coupling members such as are illustrated at the left hand end of Fig. 2 of the Moler Patent No. 2,660,753, in which the hanger block 12 as it is called is externally threaded to be threaded into the ends of the springs as is there illustrated. Right and left hand threaded members are required. Making that connection commonly requires special tools or special supporting means and therefore the parts cannot be effectively assembled on the job and the members corresponding to the applicant's coupling members must be designed for the particular springs used. Further, as stated, right and left hand coupling members are required whereas the applicant's coupling members are adapted for use in all of the various positions as illustrated and the same design of coupling members is usable at both ends of the spring and may be used with so called right and left hand torsion springs. This results in great economy in manufacture and permits assembling the parts on the job and accurate adjustment to meet particular installation and load conditions.

A further advantage is that springs sometimes break in use and the invention of this application permits replacement at the location and without requiring special or expensive tools, cutting torches and the like which are commonly required with other assemblies with which the applicant is familiar.

I have not illustrated various adaptations which may be required to meet particular conditions as it is believed that this disclosure will enable those skilled in the art to embody or adapt my invention as may be desired.

Having thus described my invention what I claim as new and desire to secure by Letters Patent is:

1. A counterbalancing means of the class described comprising a cable winding drum, a shaft therefor having a spline groove therein, end and intermediate shaft supporting brackets, a coiled torsion spring sleeved upon said shaft and having inturned lugs on its end coils, facing coupling members sleeved upon said shaft and each comprising a body portion and a spring engaging stem of such length as to supportingly receive a plurality of the coils at the ends of the spring and having a longitudinal lug receiving slot therein terminating at its inner end in opposed recesses with which the lug may be selectively engaged, said body portion having axial bores adapted to receive attaching elements and a radial bore adapted to receive a set screw and being also provided with a radial bore adapted to receive an adjusting tool, said coupling members having angularly spaced spline grooves, one of said coupling members being nonrotatably secured to said intermediate bracket and the other secured to said shaft by means of a spline after adjustment thereof to tension said spring, said spring being supported by said coupling members in concentric relation to said shaft.

2. A counterbalancing means of the class described comprising a cable winding drum, a shaft therefor, end and intermediate shaft supporting brackets, a coiled torsion spring sleeved upon said shaft and having inturned lugs on its end coils, facing coupling members sleeved upon said shaft and each comprising a body portion and a spring engaging stem of such length as to supportingly receive a plurality of the coils at the ends of the spring and having a longitudinal lug receiving slot therein terminating at its inner end in opposed recesses with which the lug may be selectively engaged, one of said coupling members being nonrotatably secured to said intermediate bracket and the other secured to said shaft after adjustment thereof to tension said spring, said spring being supported by said coupling members in concentric relation to said shaft.

3. A counterbalancing means comprising cable winding drums, a shaft therefor, a coiled torsion spring sleeved over said shaft and having inturned lugs on its end coils, coupling members sleeved upon said shaft in facing relation and each comprising a body portion and a spring engaging stem over which the ends of the spring are telescoped and having a longitudinal lug receiving slot therein terminating at its inner end in opposed lug receiving keepers with one of which the lug is retainingly engaged under torsional tension of the spring, said body portion having radial and axial fastener receiving bores therein and also being provided with a radial bore adapted to receive an adjusting tool for tensioning the spring, one coupling being nonrotatably secured to a relatively fixed support member, the other being rotatably adjustable on the shaft for variably tensioning said spring and being provided with means for securing to the shaft after such adjustment for rotation with the shaft.

4. A counterbalancing means comprising cable winding drums, a shaft therefor, a coiled torsion spring sleeved over said shaft and having inturned lugs on its end coils, coupling members sleeved upon said shaft in facing relation and each comprising a body portion and a spring engaging stem over which the ends of the spring are telescoped and having a longitudinal lug receiving slot therein terminating at its inner end in opposed lug receiving keepers with one of which the lug is retainingly engaged under torsional tension of the spring, one coupling member being nonrotatably secured to a relatively fixed support member, the other being rotatably adjustable on the shaft for variably tensioning said spring and being provided with means for securing to the shaft after such adjustment for rotation with the shaft.

5. The combination of a shaft having a spline groove therein, a coiled torsion spring sleeved over said shaft and having an inturned lug on an end coil thereof, a coupling member sleeved upon said shaft and comprising a body portion and a spring engaging stem over which the end of the spring provided with the lug telescopes and having a longitudinal lug receiving slot therein terminating with its inner end in opposed lug receiving keepers with one of which the lug is retainingly engaged under spring torsional tension, said coupling member having a spline groove therein and a spline engageable in said grooves for nonrotatably connecting said coupling member to said shaft.

6. The combination of a shaft, a coiled torsion spring sleeved over said shaft and having an inturned lug on an end coil thereof, a coupling member sleeved upon said shaft and comprising a body portion and a spring engaging stem over which the end of the spring provided with the lug telescopes and having a longitudinal lug receiving slot therein terminating with its inner end in opposed lug receiving keepers with one of which the lug is retainingly engaged under spring torsional tension, said body portion of said coupling having radial and axial fastener receiving bores therein and also being provided with a radial bore adapted to receive an adjusting tool for tensioning the spring when the other end of the spring is held against rotation.

7. A coupling member for connecting one end of a coiled torsional spring to a shaft or to a nonrotatable support member, said coupling member comprising a body portion and a spring engaging stem with which one end of a spring terminating in an inturned lug may be telescopingly engaged, the stem having a longitudinal lug receiving slot therein terminating at its inner ends in opposed lug receiving keepers disposed laterally relative to the slot and with one of which the lug is retainingly engaged when the spring is under torsional stress with the end of the spring in end thrust engagement with the body portion of the coupling member, said body portion having angularly spaced spline receiving grooves therein and being provided with a radial tool receiving bore whereby it may be rotatably adjusted on a shaft for torsionally tensioning a spring engaged thereon and also provided with radial and axial fastener element receiving bores.

8. A coupling member for connecting one end of a coiled torsional spring to a shaft or to a nonrotatable support member, said coupling member comprising a body portion and a spring engaging stem with which one end of a spring terminating in an inturned lug may be telescopingly engaged, the stem having a longitudinal lug receiving slot therein terminating at its inner ends in opposed lug receiving keepers disposed laterally relative to the slot and with one of which the lug is retainingly engaged when the spring is under torsional stress with the end of the spring in end thrust engagement with the body portion of the coupling member.

References Cited in the file of this patent

UNITED STATES PATENTS

| | | |
|---|---|---|
| 1,835,258 | Axe | Dec. 8, 1931 |
| 1,992,006 | Greegor | Feb. 19, 1935 |
| 2,032,951 | Pixley | Mar. 3, 1936 |
| 2,226,017 | Pixley | Dec. 24, 1940 |
| 2,453,424 | Foster | Nov. 9, 1948 |